United States Patent [19]

Kosugi et al.

[11] Patent Number: 5,402,683
[45] Date of Patent: Apr. 4, 1995

[54] BUILT-IN AMPLIFIER-TYPE COMBUSTION PRESSURE SENSOR AND MANUFACTURING METHOD THEREOF

[75] Inventors: Masahide Kosugi; Kyosuke Ohashi, both of Toyota, Japan

[73] Assignee: Toyota Jidosha Kabushiki Kaisha, Toyota, Japan

[21] Appl. No.: 277,115

[22] Filed: Jul. 20, 1994

Related U.S. Application Data

[63] Continuation of Ser. No. 965,143, Oct. 22, 1992, abandoned.

[30] Foreign Application Priority Data

Oct. 30, 1991 [JP] Japan ............................ 3-285152
Oct. 30, 1991 [JP] Japan ............................ 3-285153

[51] Int. Cl.$^6$ ............................................. G01L 7/00
[52] U.S. Cl. ................................... 73/756; 73/706
[58] Field of Search .............. 73/706, 718, 723, 724, 73/756; 361/283

[56] References Cited

U.S. PATENT DOCUMENTS

| | | | |
|---|---|---|---|
| 4,570,097 | 2/1986 | Shukla et al. | 310/338 |
| 4,620,438 | 11/1986 | Howng | 73/35 |
| 4,645,965 | 10/1991 | Paganelli | 310/338 |
| 4,767,960 | 8/1988 | Strobel | 310/338 |
| 4,970,898 | 11/1990 | Walish et al. | 73/706 |
| 5,024,098 | 6/1991 | Petigjean et al. | 73/706 |
| 5,060,108 | 10/1991 | Baker et al. | 73/718 |

FOREIGN PATENT DOCUMENTS

73648 of 1988 Japan.
148137 of 1988 Japan.

*Primary Examiner*—Richard E. Chilcot, Jr.
*Assistant Examiner*—William L. Oen
*Attorney, Agent, or Firm*—Kenyon & Kenyon

[57] ABSTRACT

A built-in amplifier type combustion pressure sensor which can be assembled by simplified operation. A pressure detecting device is fixed to one end of a housing with leads extending inside the housing. The leads are bent in a predetermined form by inserting a spacer and a cover from an opening of the housing located on the opposite side of the pressure detecting device. An amplifier circuit board is inserted into the housing from the opening so that the leads are inserted into holes provided on the amplifier circuit board and protrude from the surface of the amplifier circuit board facing the opening side. The protruding end of each lead is connected to the amplifier circuit board.

13 Claims, 9 Drawing Sheets

BUILT-IN AMPLIFIER-TYPE COMBUSTION PRESSURE SENSOR AND MANUFACTURING METHOD THEREOF

This application is a continuation of application Ser. No. 07/965,143, filed Oct. 22, 1992, now abandoned.

BACKGROUND OF THE INVENTION

(1) Field of the Invention

The present invention relates to a built-in amplifier type combustion pressure sensor, and more particularly to a built-in amplifier-type combustion pressure sensor in which an assembling operation thereof can be improved.

(2) Description of the Related Art

As a conventional built-in amplifier type combustion pressure sensor, for example, there is suggested a pressure sensor in the Japanese Laid-Open Patent Application No. 63-73648. The sensor disclosed in the Patent Application is provided with a piezoelectric element, which is a pressure detecting portion, on one end of a cylindrical sensor body. The sensor is also provided with a circuit board, on which an amplifier circuit amplifying signals provided by the piezoelectric element is formed. The piezoelectric element is located within the sensor body oriented such that a surface of the circuit board is situated parallel to an axis of the sensor body. Lead wires extended from the piezoelectric element run through from one end of the sensor body to the circuit board along an axial direction of the sensor body and the lead wires are connected to one end of the circuit board. Output lead wires are connected to the other end of the circuit board, which is at the opposite end of the piezoelectric circuit.

The above mentioned conventional sensor is assembled with a separately prepared piezoelectric element, sensor body and a cover that covers the circuit board. After connecting the lead wires from the piezoelectric element to the circuit board and connecting the output lead wires to the circuit board, the cover is assembled in place inside the sensor body. An alternate method is integrally forming the sensor body and the cover; pulling out the lead wires extended from the piezoelectric element and connecting the lead wires and the output lead wires to the circuit board; inserting the circuit board into the cover by placing the lead wires from the piezoelectric element inside the cover.

In the first assembling method, it is a troublesome matter to insert and fix the circuit board, which board which has already been connected to the lead wires, to the sensor body. In the second assembling method, a great care must be taken when inserting the lead wires into the cover of the sensor body so as to prevent the lead wires from contacting and damaging component parts on the circuit board. Thus, the conventional built-in amplifier-type combustion pressure sensor has a problem in that the assembling operation is not effectively conducted.

SUMMARY OF THE INVENTION

It is a general object of the present invention to provide an improved built-in amplifier type combustion pressure sensor and its manufacturing method in which the above mentioned disadvantages are eliminated.

A more specific object of the present invention is to provide a built-in amplifier type combustion pressure sensor which can be assembled by an improved assembling operation.

The above mentioned objects of the present invention are achieved by a built-in amplifier type combustion pressure sensor comprising:
   a housing;
   a pressure detector provided on one end of the housing for detecting an external pressure and converting the pressure into electric signals so as to output the signals via a lead extended in the housing;
   an amplifier circuit board, having a through hole into which the lead is inserted, situated in the housing so that a mounting surface of the amplifier circuit board lies perpendicular to an extending direction of the lead, amplifying the electric signals provided via the lead; and
   a connection means for connecting the lead extending through the through hole and protruding from a surface opposite to the pressure detector, to the amplifier circuit board from the opposite side of the pressure detector.

A manufacturing method of a built-in amplifier type pressure sensor according to the present invention comprises:
   fixing a pressure detecting device detecting an external pressure and converting the detected external pressure into electric signals so that the electric signals are output via a lead extending inside the housing from the pressure detecting device;
   inserting an amplifier circuit board, amplifying the electric signals provided via the lead and having a through hole into which the lead is inserted, so that a mounting surface of the amplifier circuit board lies perpendicular to an extending direction of the lead and an end of the lead protrudes from a surface of the amplifier circuit board facing opposite to the pressure detecting device by passing through the through hole; and
   connecting the end of the lead to the amplifier circuit board from the direction from which the amplifier circuit board is inserted.

According to the present invention, an assembling operation of the lead onto the circuit board can be conducted from reverse side of the pressure detecting device. Thus, the assembling operation of the amplifier circuit board can be conducted after inserting the amplifier circuit board into the housing; the mounting operation of the amplifier circuit board to the housing and the connecting operation of the lead to the amplifier circuit board can be easily conducted.

Other objects, features and advantages of the present invention will become more apparent from the following detailed description when read in conjunction with the accompanying drawings.

BRIEF DESCRIPTION OF THE DRAWINGS

FIGS. 7a, 7B and 7C are partial cross sectional views of the plate 22 taken along a line of VII—VII of FIG. 2B for explaining a mounting method of capacitors 23 to the plate 22; FIG. 7A showing the plate 22 before the capacitors 23 are inserted; FIG. 7B showing a state where solder is filled around the capacitors 23; FIG. 7C showing a state where hot air is applied to the solder;

FIG. 8a is a side view of an output pin 13 having three protrusions formed on an outer periphery of a piercing portion 13a and FIG. 8b is a cross sectional view taken along a line VIIIb—VIIIb of FIG. 8a;

DETAILED DESCRIPTION OF THE PREFERRED EMBODIMENTS

Figure 1:
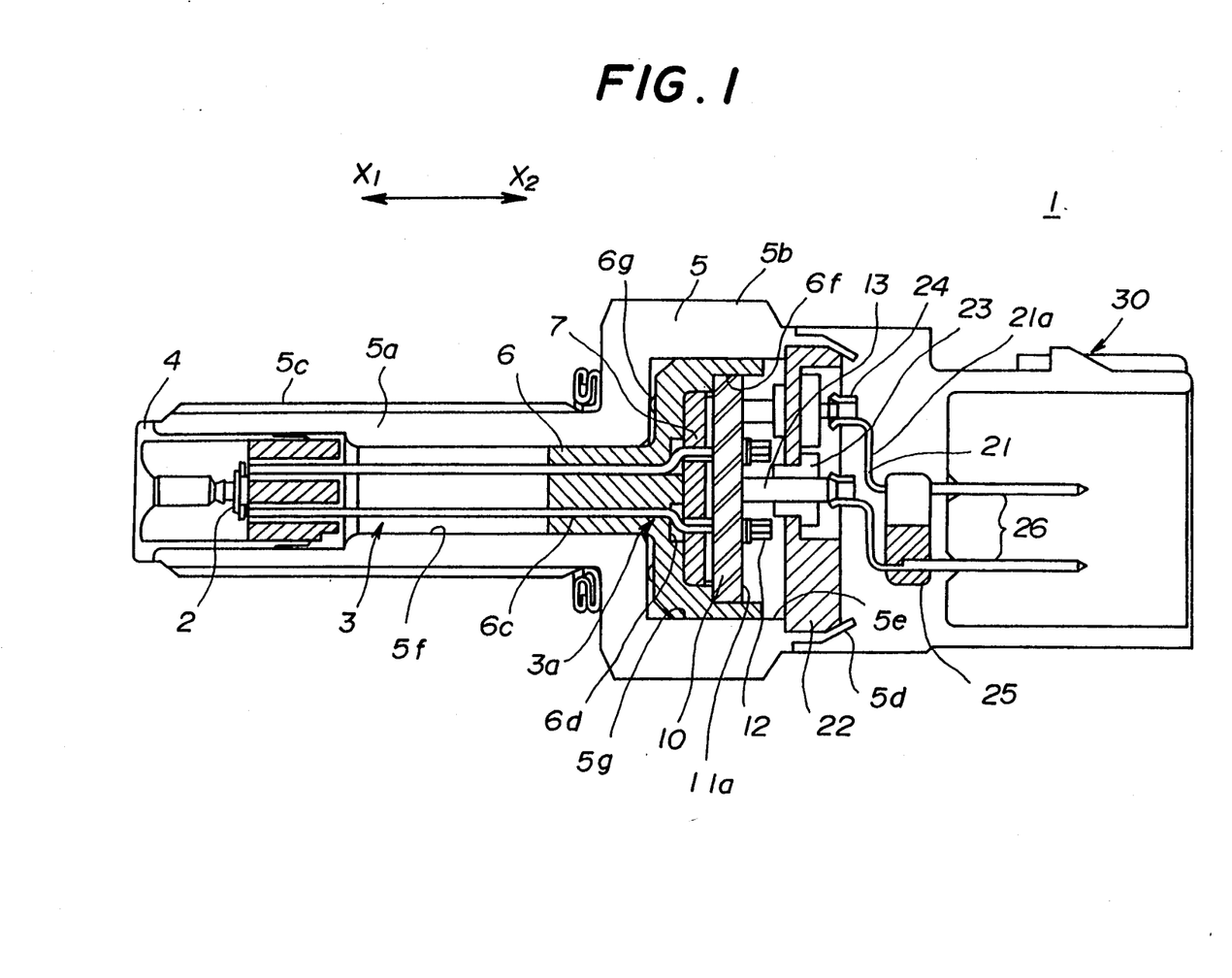
FIG. 1 is a cross sectional view of an embodiment according to the present invention.

FIG. 1 is a cross sectional view of an embodiment of a built-in amplifier type combustion pressure sensor according to the present invention. A built-in amplifier type combustion pressure sensor 1 shown in FIG. 1 is used to measure pressure inside a cylinder of an engine not shown in the figure. In FIG. 1, a notation 2 indicates a semiconductor element, corresponding to the above mentioned pressure detecting portion, outputting electric voltage signals corresponding to pressure by piezoelectric effect. A notation 3 indicates leads connected to the semiconductor element 2. An element assembly 4 comprises the semiconductor element 2, the leads 3 and other component parts. A cylindrical housing 5, the main body of the embodiment of a built-in amplifier type combustion pressure sensor according to the present invention, is made of stainless steel (SUS304) and comprises a small diameter portion 5a and a large diameter portion 5b. The element assembly 4 is press fitted into an end of the small diameter portion 5a of the housing 5. The leads 3 run through a longitudinal hole 5f formed along an axial direction of the small diameter portion 5a (the direction indicated by the arrow $X_1$–$X_2$). The outer surface of the small diameter portion 5a is formed with a thread so that the sensor 1 is screwed into and fixed to a cylinder head of an engine not shown in the figure. A spacer 6, through which the leads 3 are extended, is fitted in the conjunction portion of the hole 5f of the small diameter portion 5a and the space 5g of the large diameter portion 5b.

Figure 2A:
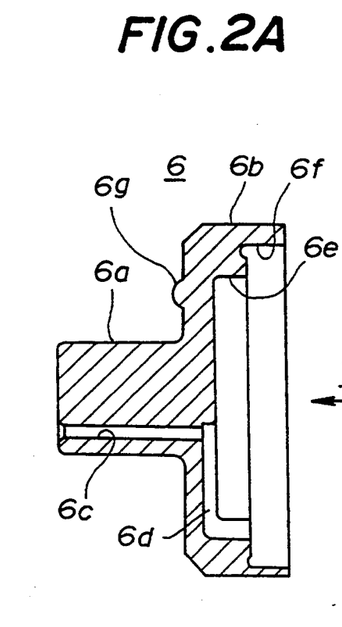
FIG. 2A is a sectional view of a spacer 6.
Figure 2B:
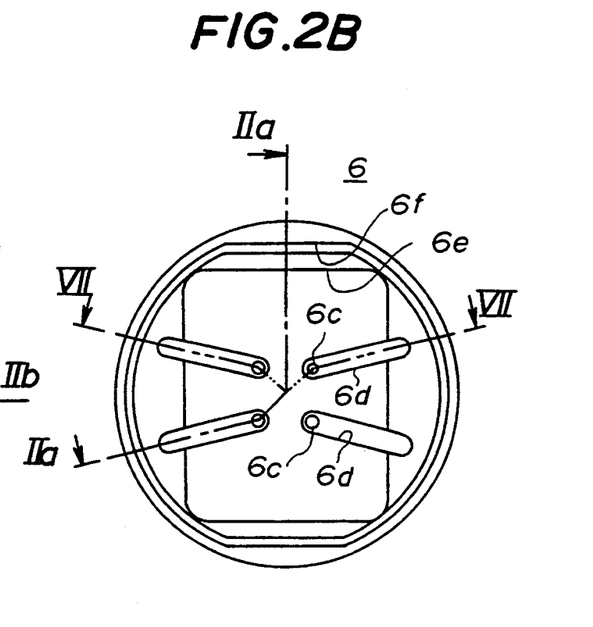
FIG.2B is a view of the spacer 6 from a direction indicated by arrow IIb in FIG. 2A.

FIG. 2A is a sectional view of the spacer 6 and FIG. 2B is a view from the direction indicated by the arrow IIb in FIG. 2A. FIG.2A is taken along the line IIa—IIa of FIG. 2b. The spacer 6 is made of plastics such as Nylon and comprises a small diameter portion 6a fitted into the hole 5f of the housing 5 and a large diameter portion 6b fitted into the space 5g of the large diameter portion 5b of the housing 5. Four through holes 6c into which the leads 3 are respectively inserted are formed on the large diameter portion 6. Four grooves 6d which extend outwardly from one end of each hole 6c are formed on the large diameter portion 6b. Additionally, a round shaped recess 6f, which receives an amplifier circuit board 10, is formed in the large diameter portion 6b, and also a nearly rectangular shaped recess 6e, which receives a cover 7, is formed further inside of the large diameter portion 6b.

Figure 3A:
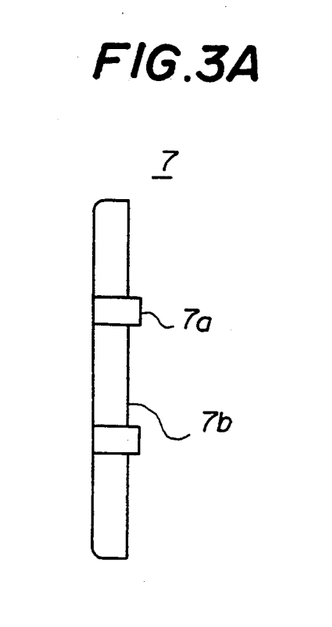
FIG. 3A is a side view of a cover 7.
Figure 3B:
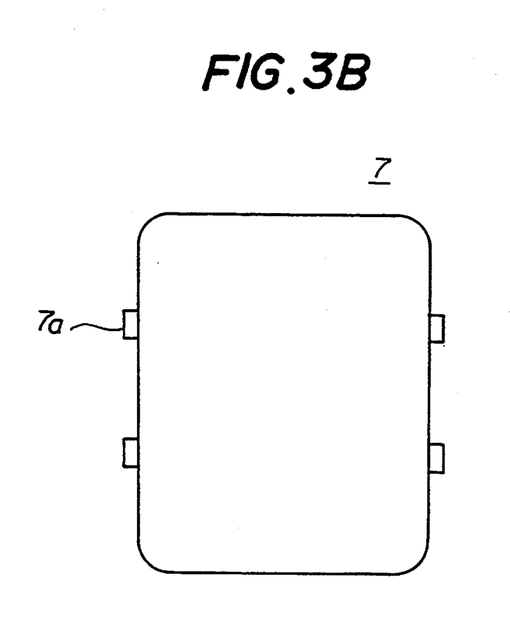
FIG. 3B is a plan view of the cover 7.

FIG. 3A shows a side view of the cover 7, and FIG. 3B shows a plan view of the cover 7. Similar to the spacer 6, the cover 7 is made of plastics such as Nylon and formed in a nearly rectangular shape so as to be fitted into the recess 6e. As shown in FIG. 3B, the cover 7 has four protrusions 7a on opposing side faces and one end of each protrusion 7a protrudes from a surface of the cover 7. The position of each protrusion 7a corresponds to the position where each groove 6d is located in a state where the cover 7 is fitted into the recess 6e.

As shown in FIG. 1, each lead 3 is inserted into a respective through hole 6c of the spacer 6 and is perpendicularly bent at the junction of the groove 6d and the hole 6c. Each lead 3 then runs along the groove 6d and is bent again at the position where the protrusion 7a is located. Due to the perpendicular portion 3a of each lead 3, generation of a heat stress in each lead 3 caused by heat expansion is prevented.

Additionally, a plurality of protrusions 6g are provided on the surface of the spacer 6 opposite to a surface of the housing 5. Those protrusions 6g absorb a stress caused by a difference between each component part of the sensor 1 by deforming in an axial direction of the sensor 1. Instead of providing the protrusions 6g, a wave washer or a rubber washer having a elasticity lower than that of plastics of the spacer 6 may be provided between the spacer 6 and the housing 5 so as to absorb heat stress.

Figure 4:
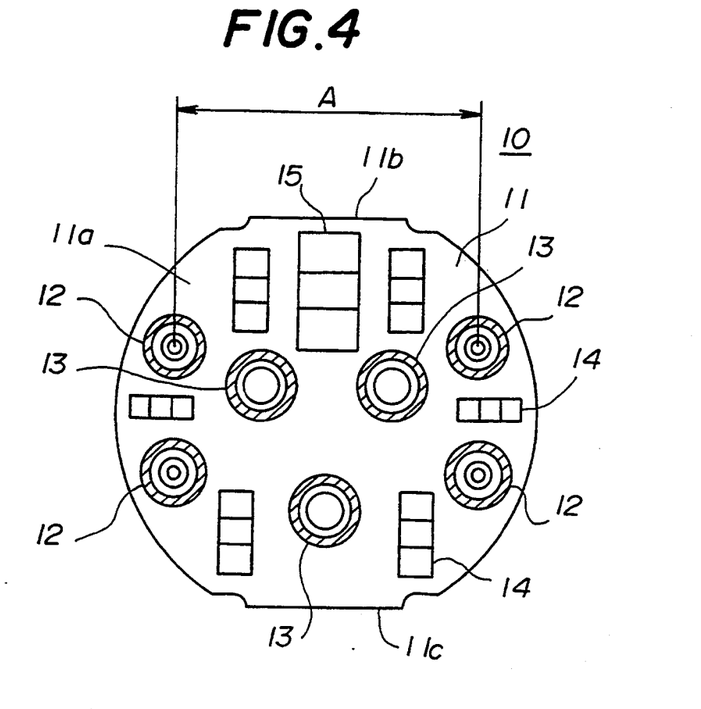
FIG. 4 is a view of an amplifier circuit board 10 taken from a direction indicated by arrow $X_1$

The amplifier circuit board 10, which is a multi-layered ceramic board hybrid integrated circuit (abbreviated HIC), is fitted in the recess 6f of the spacer 6. FIG. 4 shows a view of the amplifier circuit board 10 from the direction indicated by the arrow $X_1$. The amplifier circuit board 10 includes four taper bushes 12 and three output pins 13 mounted on a surface 11a of board body 11 by brazing, and the amplifier circuit board 10 also includes a plurality of resistors 14 and one capacitor 15 mounted by soldering. Each of the four taper bushes 12 is located at a position corresponding to one of the respective four leads 3 extending in the direction indicated by the arrow $X_2$. Since the board body 11 is provided with a pair of parallel side faces 11b and 11c, the amplifier circuit board 10 is situated in a predetermined position.

The amplifier circuit board 10 is placed in a state where the surface 11a lies in a plane perpendicular to the axis of the housing 5. Accordingly, a miniaturization of the sensor 1 in an axial direction is obtained compared to the conventional built-in amplifier type combustion pressure sensor. Additionally, the size of the amplifier circuit board 10 is reduced by using a multi-layered ceramic board compared to the conventional circuit board.

Figure 5:
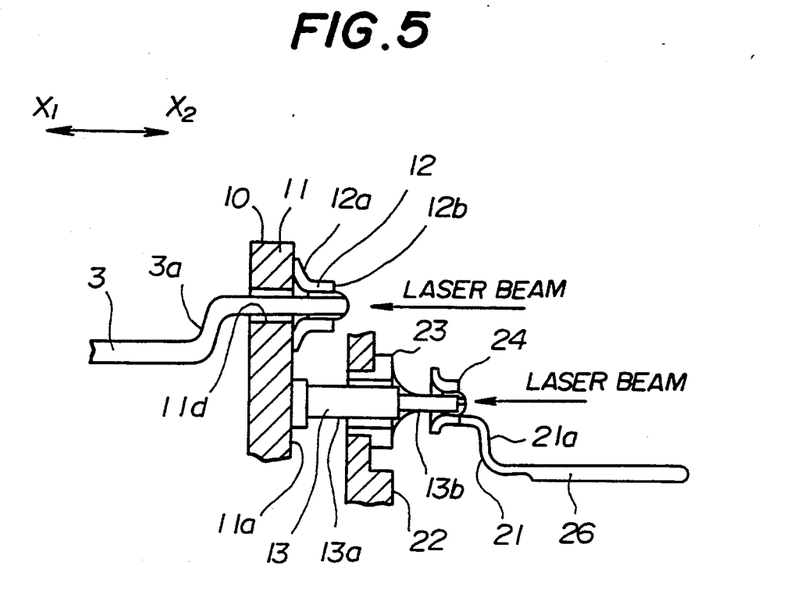
FIG. 5 is a partial cross sectional view explaining a connection between a lead 3 and a taper bush 12, and also explaining a connection between an output pin 13 and an output lead 21.

FIG. 5 is a partial cross sectional view explaining the connection between each lead 3 and respective taper bush 12, and also explaining the connection between each output pin 13 and respective output lead 21. A through hole 11d having a slightly larger diameter than the diameter of the lead 3 is formed in the board body 11 at the position where each taper bush 12 is located on the board body 11. Each taper bush 12 comprises a taper portion 12a and cylindrical portion 12b, and a bottom face of the taper portion 12a is brazed onto the surface 11a of the board body 11. The inner diameter of the cylindrical portion 12b is nearly the same as the diameter of the lead 3 so that the lead 3 and the taper bush 12 can have a loose fit.

Each lead 3 is inserted into the respective through hole 11d and then inserted into the taper bush 12 in a direction indicated by the arrow $X_2$ until an end of the lead 3 comes out of the taper bush 12. Then, the end of the lead 3 is welded to an end of cylindrical portion 12b of the taper bush 12 by a laser beam welding method.

According to the above mentioned structure of the taper bush 12, the connection between the taper portion 12a and the board body 11 can be strengthened because a wide contacting area of the taper portion 12a to the board body 11 can be formed. The end of each lead 3 is guided by the taper portion 12a and the cylindrical portion 12b which results in accurate positioning of each lead 3 which is necessary in order to conduct a laser beam welding. Additionally, since the inner diameter of the cylindrical portion 12b is close to the diameter of the lead 3, effective welding can be performed with good connection between the taper bush 12 and the lead 3. Further, the guiding function of the taper portion 12a gives smooth guiding of the lead 3 to the narrow hole of the cylindrical portion of the taper bush 12. With the combination of the above mentioned advantages, a good connection between the amplifier circuit board 10 and the lead 3 can be performed by a simple operation.

The brazing of the taper bush 12 and the output pin 13 to the board body 11 is normally performed at a temperature ranging from 700° to 1000° C. Since the temperature of the brazed portion of each taper bush 12 and the respective output pin 13 is about 150° C. while the sensor 1 is in use, the brazed portion of the taper bush 12 and the output pin 13 maintain a good strength. Therefore, the loosening of the taper bush 12 and output pin 13 at the brazing portion due to the temperature rise while in use, is eliminated.

The output pins 13 are the terminals for outputting signals of the amplifier circuit and each output pin 13 comprises a capacitor piercing portion 13a and a connection pin 13b. A plate 22, made of 4-2 alloy (alloy comprising iron and nickel), is provided for hermetically sealing the sensor 1. The plate 22 is positioned at an end of the large diameter portion 5b of the housing 5 with a narrow gap between the plate 22 and the amplifier circuit board 10. The plate 22 is fixed to the housing 5 by caulking a caulking portion 5d of the large diameter portion 5b. Therefore, an annular capacitor 23 is provided at the portion where the piercing portion 13a pierces the plate 22 so as to eliminate electric noise. The annular capacitor 23 and the plate 22, and the annular capacitor 23 and the output pin 13 are connected by soldering.

Figure 6A:
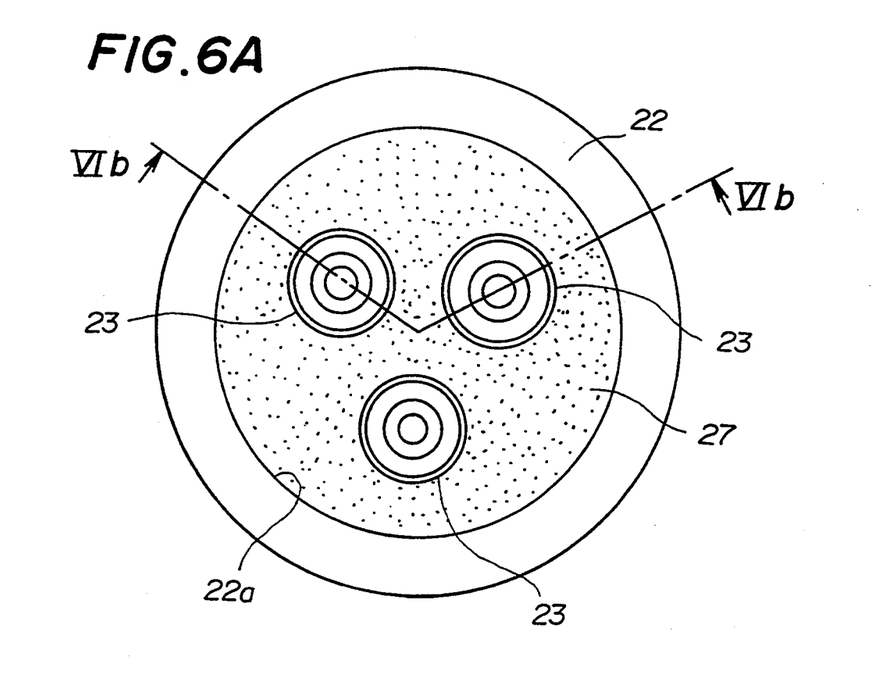
FIG. 6A is a plan view of a plate 22 and FIG. 6B is a cross sectional view of the plate 22 taken along a line VIb—VIb of FIG.6A.
Figure 6B:
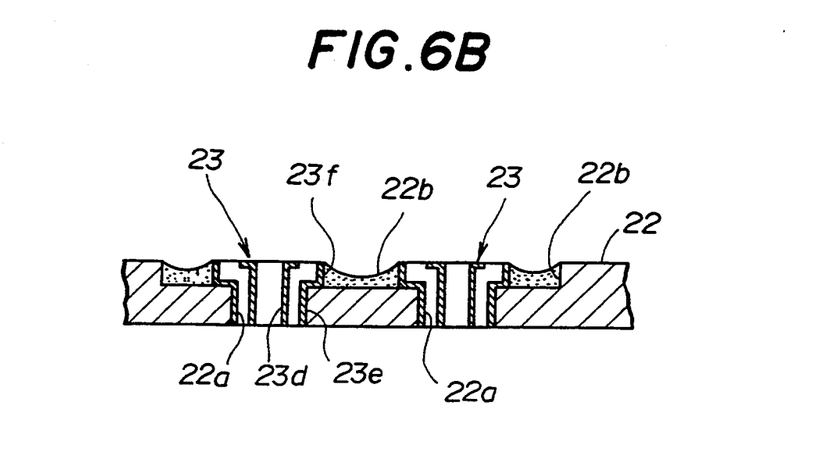

Now, a description will be given of the structure of the capacitor 23 and its mounting method. FIG. 6A is a plan view of the plate 22 and FIG.6B is a cross sectional view of the plate 22 taken along the line VIb—VIb of FIG. 6A. Three annular capacitors 23 are fixed in the plate 22 by solder 27 which solder also gives an electrical connection between the plate 22 and the capacitors 23.

Each capacitor 23 has a nearly cylindrical shape having a through hole 23d in the center so as to receive the lead 13 not shown in the figure. A lower portion 23e of the capacitor 23 is fitted in a hole 22a of the plate 22, and an upper portion 23f of the capacitor 23 has a larger diameter than the lower portion. The capacitor 23 is made of ceramics and is provided with conductive films on the entire inner surface of the hole 23d and on a center portion of a top surface of the upper portion 23f. A conductive film is also provided on an outer periphery of the capacitor 23.

A recessed portion 22b, which covers three capacitors 23, is formed on the plate 22, and an amount of solder 27 is applied uniformly around the capacitors 23 inside the recessed portion 22b.

Figure 7A:
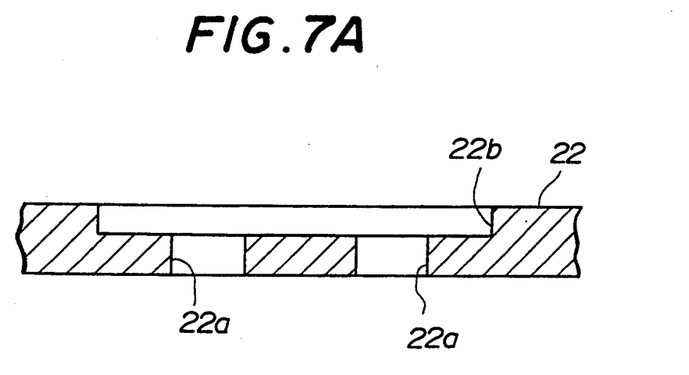
Figure 7B:
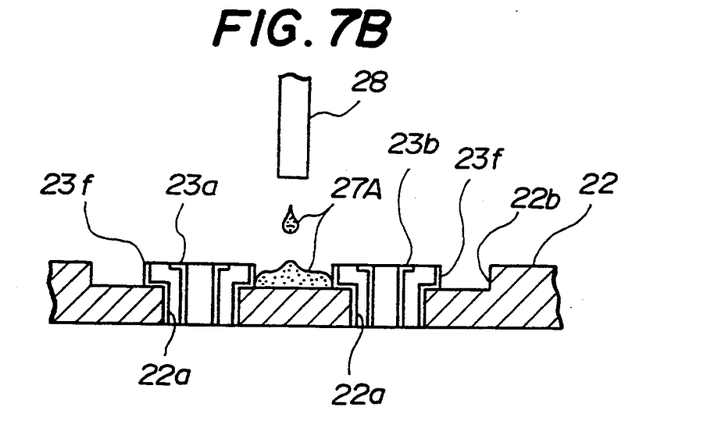
Figure 7C:
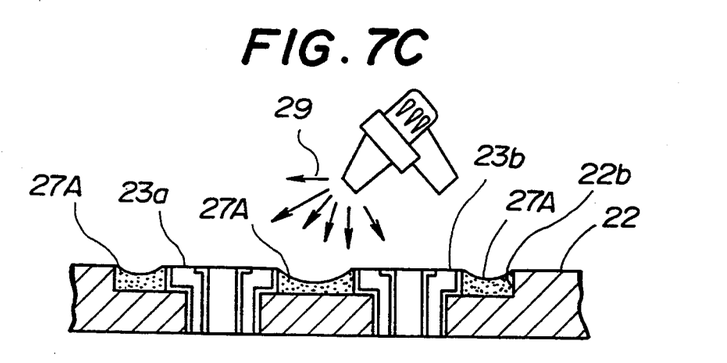

Next, a description of a mounting method of the capacitor 23 to the plate 22 will be given with reference to FIGS. 7A, 7B and 7C. As shown in FIG. 7A, the through holes 22a and the recessed portion 22b are formed on the plate 22. The diameter of each through hole 22a is almost the same as the outer diameter of the lower portion 23e of the capacitor 23 so as to form a loose fit. The recessed portion 22b has a diameter sufficient to cover the three upper portions 23f of the capacitors 23 to provide a sufficient space around the upper portion 23f.

The three capacitors 23 are respectively inserted into the through holes 22a. As shown in FIG. 7B, a predetermined amount of cream solder 27A is poured into the recessed portion 22b around the upper portions 23f. The amount of cream solder is determined so that the cream solder is uniformly filled around the upper portions 23f of the capacitor 23 and the surface of the cream solder does not go over top surface of the upper portions 23f of the capacitors 23.

After the cream solder 27A is filled up, the cream solder 27A is heated up by hot air 29 so as to be hardened. The cream solder 27 shown in FIGS. 6A and 6B is in the hardened state of the solder 27A. The capacitors 23 are fixed to the plate 22 and the conductive film on the outer surface of each capacitor 23 is electrically connected to the plate 22 by the hardened solder 27. The heat for hardening the solder 27A may be applied by means of an infrared beam or a hot plate.

According to the above mentioned mounting method of the capacitors 23, a plurality of capacitors can be easily fixed to the plate 22 at the same time.

The capacitors may be mounted to the plate 22 by another method as described below. The above mentioned capacitor mounting method may have a problem in that the capacitor 23 may be lifted up while the cream solder is poured due to a difference between the specific weight of the solder 27A and the capacitor 23. This is because the specific weights of the solder 27A is greater than that of the capacitor 23.

Figure 8A:
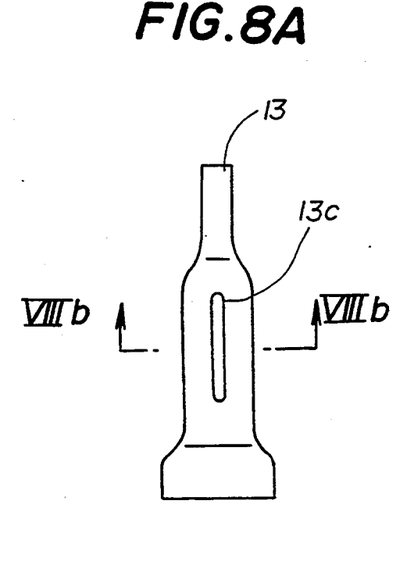
Figure 8B:
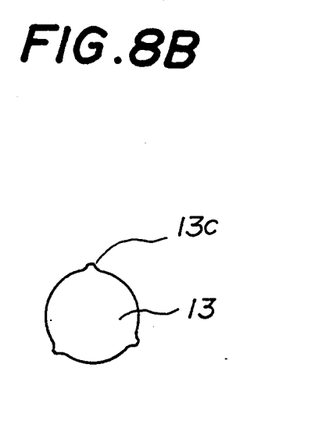

In order to eliminate the above disadvantage, the output pin 13 may have a plurality of protrusions 13c, as shown in FIGS. 8A and 8B. FIG. 8a is a side view of the output pin 13 having three protrusions 13c formed on an outer periphery of the piercing portion 13a and FIG. 8b is a sectional view taken along the line VIIIb—VIIIb of FIG. 8a. The distance between the tip of the protrusion 13c and the center of the output pin 13 is slightly larger than a radius of the hole 23d of the capacitor 23 so that the hole 23d is to be slightly pressed when assembling the capacitor 23 to the output pin 13.

The mounting procedure of the capacitor 23 is different from the aforementioned method. First, the amplifier circuit board 10 having output pins 13 formed with the protrusions 13c is assembled on the housing 5. Second, the plate 22 alone is mounted on the housing 5 without the capacitors 23 being mounted. In this state, the output pins are extended through the holes 22a of the plate 22. Then, the capacitors 23 are inserted into the holes 22a while press fitting the hole 23d to the output pins 13. After insertion of the capacitors 23 is complete, cream solder is applied and is hardened in the same manner as mentioned above.

According to the second method mentioned above, the capacitors 23 are held in the right position while the solder is poured due to the fitting force between the capacitors 23 and the output pins 13; this results in a stable mounting of the capacitors 23 to the plate 22.

Further, when applying an amount of solder around the capacitors 23, additional amounts of solder may be applied around the center of the top surface of each capacitor 23. By doing this, soldering of each output pin 13 to the respective capacitor 23 is performed at the same time as mounting the capacitor 23 to the plate 22. Because solder does not easily adhere to ceramic, an excess amount of solder will flow to the outside of the ceramic portion of the capacitors 23 and this enables simultaneous soldering of the capacitors 23 to the plate 22 and the output pins 13.

Now, returning to the description of the sensor 1, as shown in FIG. 1, three output leads 21 corresponding to three output pins 13 are supported by a supporting member 25. Similar to the leads 3, each output lead 21 has a perpendicularly extended portion 21a so as to absorb heat stress and has a taper bush 24, similar to the taper bush 12, on one end thereof. Each taper bush 24 is positioned so as to come into contact with an end of the output pin 13 by means of the supporting member 25 and is welded to the respective output pin 13 by means of a laser beam welding method. The other end of each output lead 21 is connected to a connector terminal 26 inside the supporting member 26.

The label 30 indicates a connector portion of the sensor 1. The connector portion 30 is formed by an insert molding method after connecting each taper bush 24 to each output pin 13 and positioning each connector terminal 26 at a predetermined position.

Figure 9:
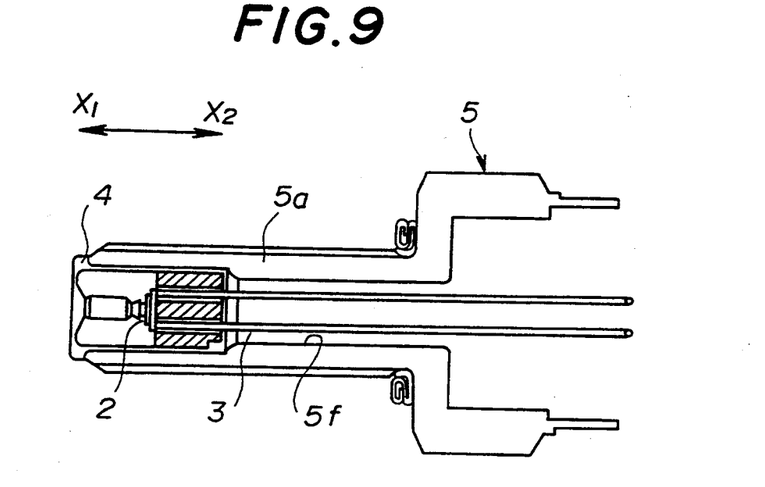
FIG.9 is a cross sectional view for explaining an assembling method of the embodiment shown in FIG. 1.

Next, a description will be given of an assembling method of the sensor 1 with reference to FIGS. 9 to 13. First, as shown in FIG. 9, each straightly extending lead 3 is inserted into the respective hole 5f, longitudinally extended in the small diameter portion 5a of the housing 5, from an end thereof in the direction indicated by arrow $X_2$. Then the element assembly 4 is fixed to the housing 5 by press fitting a portion provided with the semiconductor element 2 into an end portion of the small diameter portion 5a in the direction indicated by arrow $X_2$.

Figure 10:
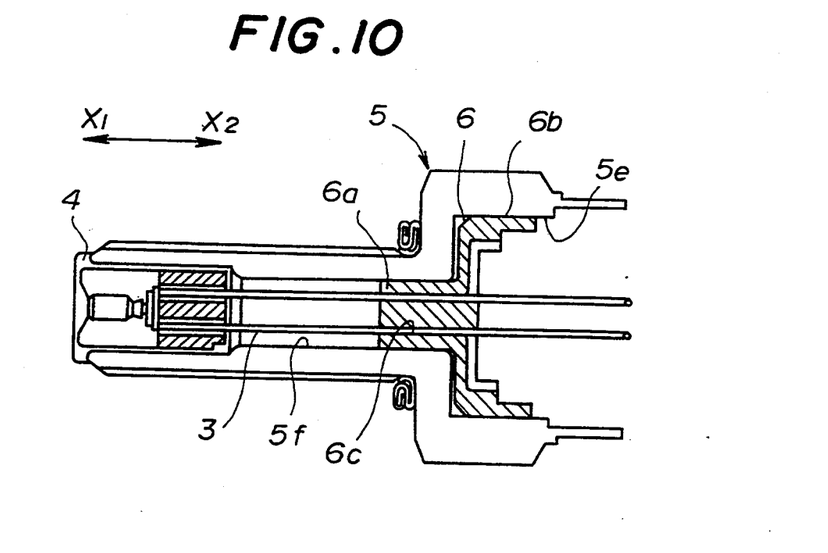
FIG. 10 is a cross sectional view for explaining an assembling method of the embodiment shown in FIG. 1.

Second, as shown in FIG.10, the spacer 8 is inserted into the housing 5 in a direction indicated by arrow $X_1$ so that the small diameter portion 6a fits into the hole 5 and the large diameter portion fits into the opening 5e of the housing 5. In this process, each of the four leads 3 is respectively inserted into the through holes 6c of the small diameter portion 6a.

Figure 11:
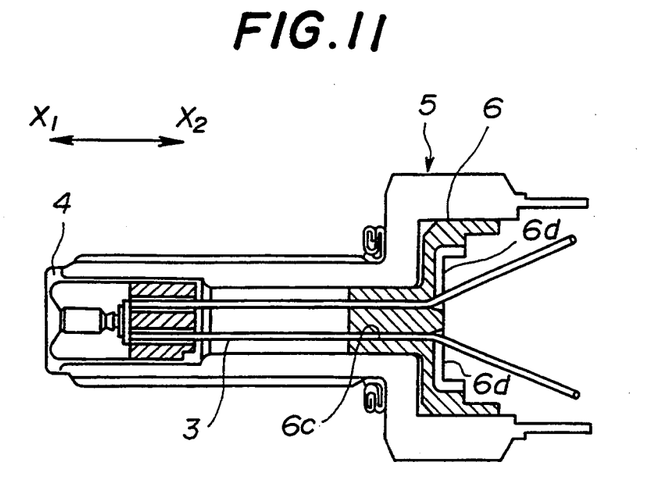
FIG. 11 is a cross sectional view for explaining an assembling method of the embodiment shown in FIG. 1.

Third, as shown in FIG. 11, the four leads 3 are spread in the direction of the corresponding groove 6d by bending at the portion located at the junction of the groove 6d and through hole 6c.

Figure 12:
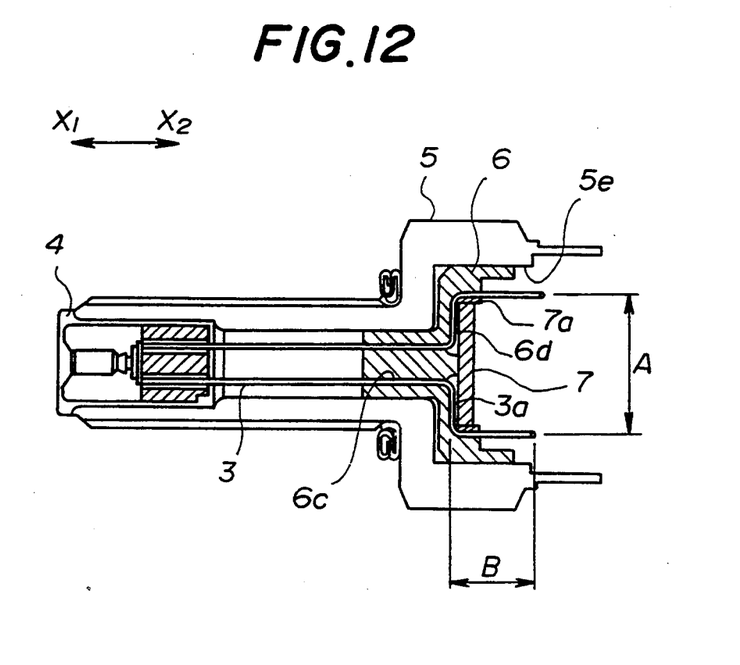
FIG. 12 is a cross sectional view for explaining an assembling method of the embodiment shown in FIG. 1.

Next, the cover 7 is situated with the protruding direction of the protrusions 7a matching the direction indicated by arrow $X_2$, and the cover 7 is pressed in the direction indicated by arrow $X_1$ until its surface makes contact with the inner face of the large diameter portion 6b. In this process, each protrusion 7a comes into contact with a respective lead 3 which has been bent in the process described in the above with reference to FIG. 11. As the cover moves further inside in the direction indicated by the arrow $X_1$, each lead 3 is further bent at the portion located at the junction of the groove 6d and the through hole 6c. At the same time, the portion of each lead 3 located outside of the cover 7 is sandwiched between an end surface of the groove 6d and a side face of the protrusion 7a. When the cover 7 is completely pressed into the spacer 6, as shown in FIG. 12, each lead 3 is bent in two places; this results in the formation of the perpendicularly extended portion 3a between the two bent portions.

Additionally, the position of the end portion of each lead 3 extending in the direction indicated by arrow $X_2$ matches the position of the respective taper bush 12 on the amplifier circuit board 10. That is, the position of the end face of each groove 6d and each protrusion 7a are determined so that the pitch between each lead 3 becomes equal to the pitch between each taper bush 12. Further, the dimension B of the lead 3 in the direction indicated by arrow $X_1X_2$ is set to an optimum length so as to perform a laser welding of the connecting portion of the lead 3 and the taper bush 12. That is, the length of the lead 3 is set to a predetermined length at the stage of single element assembly 4 so that the end portion of the lead 3 attains a length B when the lead 3 is formed in a shape as indicated in FIG. 12.

As mentioned above, by a simple operation such as spreading each lead 3 as shown in FIG. 11 and pressing in the cover 7 into a predetermined position from the opening 5e, each lead 3 is formed in a shape suitable to the next assembling process.

Figure 13:
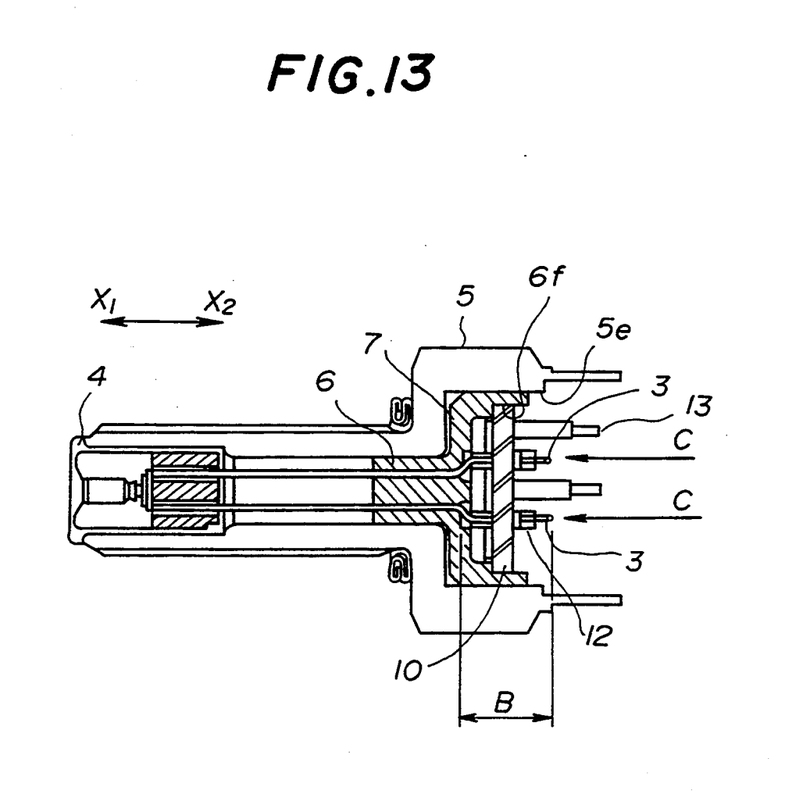
FIG. 13 is a cross sectional view for explaining an assembling method of the embodiment shown in FIG. 1.

Next, the amplifier circuit board 10 is directed with the end of each taper bush 12 in the direction indicated by the arrow $X_2$ which is the direction of mounting of the amplifier circuit board 10 to the recessed portion 6f of the spacer 6. Then the amplifier circuit board 10 is moved from the opening 5e in the direction indicated by the arrow $X_1$. During the movement in the direction indicated by the arrow $X_1$, each lead 3 is inserted into the respective through hole 11d and taper bush 12 of the amplifier circuit board 10. At the stage when mounting of the amplifier circuit board 10 to the recessed portion 6f is complete, as indicated in FIG. 13, the amplifier circuit board 10 is situated in a position perpendicular to the axis of the housing 5. An end portion of each lead 3 is protruding from an end of a respective taper bush 12. Each end of the lead 3 and respective taper bush 12 are welded by applying a laser beam through the opening 6f, as indicated by arrows C in FIG. 13.

As mentioned above, since each lead 3 extended from the piezoelectric element 2 is connected by laser welding on the opposite side to the element 2, that is, the lead 3 is connected on the side of the opening 5e, the operation of connecting the lead 3 to the amplifier circuit board 10 can be conducted on the side of the opening 5e; thus an operation of mounting the amplifier circuit board 10 to the housing 5 and an operation of connecting the leads 3 to the amplifier circuit board 10 are simplified.

Additionally, use of laser welding, which has an advantage when used in a narrow space, allows a simplified connecting operation and reliable electrical connection.

Next, the plate 22 is fixed to the housing by placing the plate 22 on the opening 5e of the housing 5 and caulking the caulking portion 5d. Then, each capacitor 23 is soldered to respective output pin 13. This soldering operation is also performed from the opening 5e side.

Next, as shown in FIG. 5, each taper bush 24 of a pre-assembled assembly comprising output leads 21, taper bushes 24, a supporting member 25 and a connecter terminal 26 is inserted into a connecting portion 13b of respective output pin 13. After that, each output pin 13 and respective output lead 21 are welded by laser beam welding, similar to the above mentioned laser welding of the leads 3, by applying a laser beam to an end of each connecting portion 13b in the direction indicated by the arrow $X_2$.

Lastly, after situating the connector terminal 26 in a predetermined position, a connector portion 30 is formed into a predetermined shape by insert molding as shown in FIG. 1.

By the above mentioned assembling method of the embodiment according to the present invention, all the components assembled after the element assembly 4 is mounted to the housing 5 are assembled, in turn, from the opening 5e of the housing 5, and the leads 3 extended from the semiconductor element 2 are connected to the amplifier circuit board 10 from the opening 5e side of the board 10. Additionally, The connecting operation of the output pins 21 to the amplifier circuit board 10 is also performed at the opening 5e side of the housing 5. Therefore, an assembling operation of the sensor 1 according to the present invention is greatly improved compared to that in the conventional pressure sensor.

Additionally, since the amplifier circuit board 10 is situated in a position perpendicular to the axis of the housing 5 of the sensor 1 and the size of the amplifier circuit board 10 itself is minimized by adopting a multi-layered ceramic board, the sensor 1 according to the present invention is smaller compared to the conventional sensor.

Further, since a laser welding method is employed instead of a soldering method, that is allowed by the structure of the sensor 1, reliability of an 10 electrical connection of the sensor 1 is obtained under conditions of high temperature and vibration.

The present invention is not limited to the specifically disclosed embodiments, and variations and modification may be made without departing from the scope of the present invention.

What claimed is:

1. A built-in amplifier-type pressure sensor comprising:
    a housing having a first chamber formed on a first end thereof, a second chamber formed on a second end of the housing, the second end being opposite the first end, and a passage connecting said first chamber and said second chamber, wherein an inner diameter of said first chamber is greater than an inner diameter of said passage and wherein a diameter of an inner surface of the housing is reduced in the passage relative to an inner diameter of the housing in the first chamber;
    a pressure detecting means fitted into said first chamber for detecting an external pressure and converting the pressure into electric signals so as to output the electric signals via a lead extending through the passage in the housing, wherein an outer diameter of said pressure detecting means is greater than the inner diameter of the passage;
    an amplifier circuit board provided in the second chamber, wherein the amplifier circuit board has a through hole into which said lead is inserted and is situated in said housing so that a mounting surface of said amplifier circuit board lies perpendicular to an extending direction of said lead, and wherein the amplifying circuit board amplifies said electrical signals provided via said lead; and
    a connecting means for connecting said lead, extending through said through hole and protruding from a surface of said amplifier circuit board facing opposite to said pressure detecting means, to said amplifier circuit board from an opposite side of said pressure detecting means.

2. The sensor as claimed in claim 1, wherein said connecting means comprises an electrically conductive bush, provided on said surface of said amplifier circuit board facing opposite to said pressure detecting means, comprising a guiding portion guiding an end of said lead to a predetermined position and a connecting portion being connected to said end of said lead.

3. The sensor as claimed in claim 2, wherein said guiding portion comprises a tapered hole and an end surface of said guiding portion having a larger diameter of said tapered hole is mounted onto said amplifier circuit board in a state where said tapered hole is situated over said through hole of said amplifier circuit board.

4. The sensor as claimed in claim 3, wherein said connecting portion of said bush comprises a cylindrical hole extending from the smaller diameter of said tapered hole and a predetermined small clearance is provided between said cylindrical hole of said bush and an outer diameter of said lead.

5. The sensor as claimed in claim 1, further comprising a guiding means, provided within the passage between said pressure detecting means and said amplifier circuit board, for guiding said lead to said through hole of said amplifier circuit board.

6. The sensor as claimed in claim 5, wherein said guiding means comprises two separate members, said lead sandwiched between said two separate members so that a portion of said lead extends in a direction perpendicular to an extending direction of said lead from said pressure detecting means.

7. The sensor as claimed in claim 6, wherein one of said two separate members comprises a guiding member which includes a guiding hole into which said lead is inserted and a groove one end of which is coupled to said guiding hole and extending in a direction perpendicular to an axis of said guiding hole, the other of said two separate members comprising a pressing plate which encloses said portion of said lead extending in a direction perpendicular to an axis of said guiding hole inside said groove, said lead being bent in the same direction as the extending direction of said lead from said pressure detecting means at the end of said groove opposite to said end coupled to said guiding means so that the end of said lead is guided to said through hole of said amplifier circuit board.

8. The sensor as claimed in claim 7, wherein said guiding member and said pressing plate are formed of plastics giving an electrical insulation.

9. The sensor as claimed in claim 8, wherein said guiding member includes a plurality of protrusions on a surface abutting with a surface of said housing lying in a direction perpendicular to the axis of the extending direction of said lead from said pressure detecting means.

10. The sensor as claimed in claim 1, further comprising a metal plate member including a capacitor having a pin insertion hole of which an inner surface is provided with an electrode and being fixed to an opening of said housing located on a side opposite to said pressure detecting means so as to enclose said housing, said amplifier circuit board having an output pin being mounted on said surface of said amplifier circuit board and extending in a direction perpendicular to said surface, said output pin extending outside of said housing via said pin insertion hole of said capacitor and soldered to said electrode of said capacitor.

11. A manufacturing method of a built-in amplifier-type pressure sensor comprising:

fitting a pressure detecting device into a first chamber of a housing, wherein the first chamber is formed on a first end of the housing and wherein the pressure detecting device is inserted into the first chamber through the first end of the housing, said pressure detecting device detecting an external pressure and converting said detected pressure into electric signals so that said electric signals are output from said pressure detecting device via a lead extending through a passage formed in said housing, wherein the passage extends from the first chamber to a second chamber formed on an end of the housing opposite the end on which the first chamber is formed, and wherein an outer diameter of the pressure detecting device is greater than an inner diameter of the passage;

inserting an amplifier circuit board into the second chamber of said housing from a second end of the housing opposite to the first end, wherein the amplifying circuit board amplifies said electric signals provided via said lead and having a through hole into which said lead is inserted, so that a mounting surface of said amplifier circuit board lies perpendicular to an extending direction of said lead and an end of said lead protrudes from a surface of said amplifier circuit board facing opposite to said pressure detecting device by passing through said through hole; and connecting the end of said lead to said amplifier circuit board from a direction from which said amplifier circuit board is inserted.

12. A manufacturing method of a built-in amplifier-type pressure sensor comprising:

fitting a pressure detecting device into a first chamber of a housing, wherein the first chamber is formed on a first end of the housing and wherein the pressure detecting device is inserted into the first chamber through, the first end of the housing, said pressure detecting device detecting an external pressure and converting said detected pressure into electric signals so that said electric signals are output via a lead extending through a passage formed in said housing from said pressure detecting device, wherein the passage extends from the first chamber to a second chamber formed on a second end of the housing opposite the first end of the housing, and wherein an outer diameter of the pressure detecting device is greater than an inner diameter of the passage;

inserting a guiding member into said housing from a side opposite to said pressure detecting device, said guiding member including a guiding hole into which said lead is to be inserted and a groove, one end of which is coupled to said guiding hole, extending in a direction perpendicular to an axis of said guiding hole;

inserting a pressing plate into said housing from the side opposite to said pressure detecting device through the second end of the housing, said pressing plate enclosing said portion of said lead extending in a direction perpendicular to the axis of said guiding hole inside said groove, said lead being bent in the same direction as the extending direction of said lead from said pressure detecting device at an end of said groove opposite to said end coupled to a guiding means;

inserting an amplifier circuit board into the second chamber of said housing from a side opposite to the first chamber through the second end of the housing, wherein said amplifier circuit board amplifies said electric signals provided via said lead and has a through hole into which said lead is inserted, so that a mounting surface of said amplifier circuit board lies perpendicular to the extending direction of said lead and so that an end of said lead protrudes from a surface of said amplifier circuit board facing opposite to said pressure detecting device by passing through said through hole, wherein the end of said lead is guided into said through hole of said amplifier circuit board by means of the pressing plate; and connecting the end of said lead to said amplifier circuit board from a direction from which said amplifier circuit board is inserted.

13. The manufacturing method of a built-in amplifier-type pressure sensor as claimed in claim 12, wherein said amplifier circuit board includes an output pin mounted on and extending from the surface of said amplifier circuit board facing opposite to said pressure detecting device, said manufacturing method further comprising:

fixing a plate member inside the second chamber of said housing, wherein the plate member has a hole into which a capacitor is inserted so that a center of said hole matches an axis of said output pin;

inserting a capacitor into the hole in the plate member so that said output pin is inserted into said pin insertion hole, wherein the capacitor has a pin insertion hole, an inner surface of which is provided with an electrode, and wherein a second electrode is provided on an outer periphery of the capacitor; and soldering said electrode provided on the inner surface of said pin insertion hole to said output pin and soldering said second electrode to said plate member.

* * * * *

UNITED STATES PATENT AND TRADEMARK OFFICE
CERTIFICATE OF CORRECTION

PATENT NO. : 5,402,683                                   Page 1 of 2
DATED      : April 4, 1995
INVENTOR(S): Masahide KOSUGI, et al.

It is certified that error appears in the above-indentified patent and that said Letters Patent is hereby corrected as shown below:

Column 1, line 47, after "board;" insert --and--.

Column 1, line 52, delete "which".

Column 1, line 53, delete "a".

Column 3, line 6, change "7a" to --7A--.

Column 3, line 13, change "8a" to --8A--.

Column 3, line 16, change "8a" to --8A--.

Coumn 6, line 1, change "lead 13" to --lead 3--.

Column 6, line 32, between "over" and "top" insert --the--.

Column 7, line 37, change "member 26" to --member 25--.

Column 7, line 54, change "spacer 8" to --spacer 6--.

Column 8, line 4, delete "in the" before "above".

Column 8, line 51, change "is protruding" to --protrudes--.

UNITED STATES PATENT AND TRADEMARK OFFICE
CERTIFICATE OF CORRECTION

PATENT NO. : 5,402,683
DATED : April 4, 1995
INVENTOR(S) : Masahide KOSUGI, et al.

It is certified that error appears in the above-indentified patent and that said Letters Patent is hereby corrected as shown below:

Column 9, line 27, change "The" to --the--.

Column 9, line 44, delete "10".

Column 10, line 27, change "of" to --than--.

Column 11, line 54, delete the comma after "through".

Signed and Sealed this

Twelfth Day of September, 1995

BRUCE LEHMAN

Attest:

Attesting Officer

Commissioner of Patents and Trademarks